United States Patent
Gu

(10) Patent No.: US 12,517,644 B2
(45) Date of Patent: Jan. 6, 2026

(54) INFORMATION PROCESSING APPARATUS, NON-TRANSITORY COMPUTER READABLE MEDIUM, AND INFORMATION PROCESSING METHOD

(71) Applicant: FUJIFILM Business Innovation Corp., Tokyo (JP)

(72) Inventor: Jiali Gu, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 560 days.

(21) Appl. No.: 17/888,254

(22) Filed: Aug. 15, 2022

(65) Prior Publication Data

US 2023/0297225 A1 Sep. 21, 2023

(30) Foreign Application Priority Data

Mar. 16, 2022 (JP) ................. 2022-041321

(51) Int. Cl.
G06F 3/048 (2013.01)
G06F 3/0482 (2013.01)
G06F 3/04847 (2022.01)
G06Q 10/0633 (2023.01)

(52) U.S. Cl.
CPC ........ G06F 3/04847 (2013.01); G06F 3/0482 (2013.01); G06Q 10/0633 (2013.01)

(58) Field of Classification Search
None
See application file for complete search history.

(56) References Cited

U.S. PATENT DOCUMENTS

| | | | |
|---|---|---|---|
| 8,699,069 B2 | 4/2014 | Kise | |
| 8,903,886 B2 | 12/2014 | Masuda | |
| 2012/0096389 A1* | 4/2012 | Flam | G06F 16/168 |
| | | | 715/777 |
| 2014/0201131 A1* | 7/2014 | Burman | G06F 40/10 |
| | | | 707/608 |
| 2016/0004488 A1 | 1/2016 | Hirose | |
| 2017/0003923 A1 | 1/2017 | Hane | |
| 2017/0329506 A1* | 11/2017 | Laetham | G06F 9/451 |
| 2018/0189735 A1* | 7/2018 | Lo | G06Q 10/063118 |
| 2019/0347053 A1 | 11/2019 | Aoyama | |
| 2021/0304145 A1 | 9/2021 | Arai | |
| 2022/0067618 A1* | 3/2022 | Goli | G06F 40/211 |

(Continued)

FOREIGN PATENT DOCUMENTS

| | | |
|---|---|---|
| JP | 2013-020326 A | 1/2013 |
| JP | 5535054 B2 | 7/2014 |

(Continued)

OTHER PUBLICATIONS

Jul. 28, 2023 extended Search Report issued in European Patent Application No. 22199468.4.

(Continued)

*Primary Examiner* — Thanh T Vu
(74) *Attorney, Agent, or Firm* — Oliff PLC

(57) ABSTRACT

An information processing apparatus includes a processor configured to: receive, in response to storage of a file in a folder associated with multiple workflows, designation of selecting a workflow to be executed using the file from among the multiple workflows from a user; and execute the workflow for which the designation is received.

15 Claims, 13 Drawing Sheets

(56) References Cited

U.S. PATENT DOCUMENTS

2022/0067661 A1    3/2022  Bowers
2023/0236783 A1*  7/2023  Morales ................ G06F 3/1285
                                                        358/1.15

FOREIGN PATENT DOCUMENTS

| JP | 2014-154120 A | 8/2014 |
|---|---|---|
| JP | 2016-015007 A | 1/2016 |
| JP | 5845667 B2 | 1/2016 |
| JP | 2016-177619 A | 10/2016 |
| JP | 2019-201240 A | 11/2019 |

OTHER PUBLICATIONS

Nov. 25, 2025 Office Action issued in Japanese Patent Application No. 2022-041321.

* cited by examiner

FIG. 4

| FOLDER NAME | WORKFLOW ID | DISPLAY NAME | TASK | | | FILE NAME | STATUS |
|---|---|---|---|---|---|---|---|
| | | | FIRST TASK | SECOND TASK | ... | | |
| F001 | WF001 | PURCHASE APPLICATION FLOW | VERIFY | SIGN | ... | PA216818 | IN EXECUTION (APPROVE) |
| | WF002 | INTRA-SECTION CIRCULATION FLOW | SIGN | APPROVE | ... | PA215014 | SUSPENDED (VERIFY) |
| | WF003 | PRODUCTION, INVENTORY, AND ACCOUNTING DEPARTMENTS BROADCAST FLOW | VERIFY | SIGN | ... | ... | ... |
| | ... | ... | ... | ... | ... | ... | ... |
| F002 | ... | ... | ... | ... | ... | ... | ... |
| ... | ... | ... | ... | ... | ... | ... | ... |

82

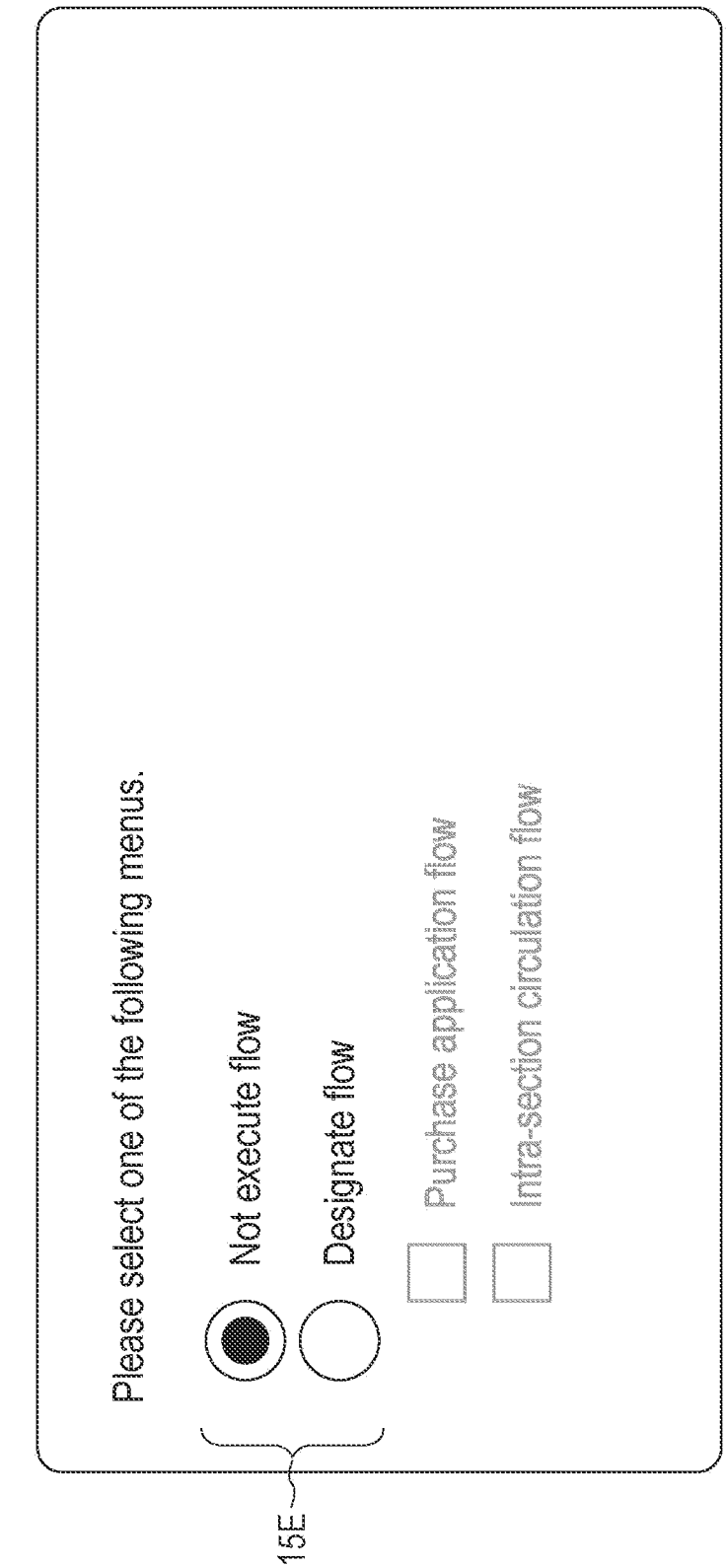

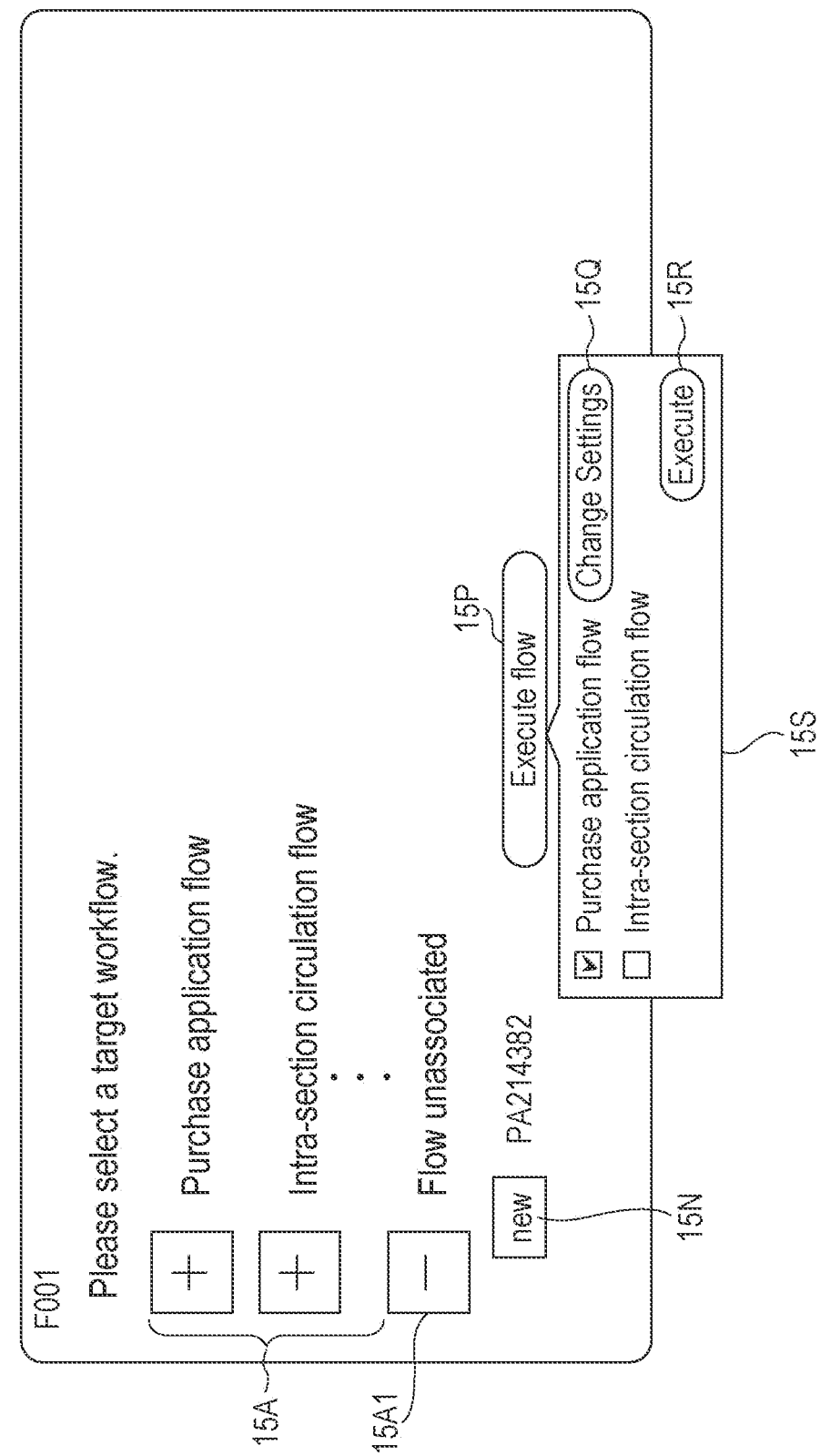

INFORMATION PROCESSING APPARATUS, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2022-041321 filed Mar. 16, 2022.

BACKGROUND

(i) Technical Field

The present disclosure relates to an information processing apparatus, a non-transitory computer readable medium, and an information processing method.

(ii) Related Art

Japanese Patent No. 5535054 discloses an information processing apparatus that enables job data stored in a folder to be securely processed and enables the processing state of the job data to be easily indicated.

This information processing apparatus performs processing on job data stored in a folder, and includes an input unit, a movement unit, a first storage unit, an execution unit, and a second storage unit. The input unit inputs an execution instruction file including a description of an instruction for executing processing to a first folder. In response to the execution instruction file being input by the input unit, the movement unit moves job data stored in the first folder and to be subjected to the processing to a second folder different from the first folder. After the movement performed by the movement unit, the first storage unit stores a file including a description indicating that the processing is in execution in the first folder. The execution unit performs the processing on the job data moved to the second folder by the movement unit and to be subjected to the processing. In response to an end of the processing performed by the execution unit, the second storage unit stores a file including a description indicating the end of the processing in the first folder in place of the file including the description indicating that the processing is in execution.

Japanese Patent No. 5845667 discloses a workflow processing apparatus that enables flow definition data to be dynamically changed and enables processing to be performed in accordance with the resulting flow definition data.

This workflow processing apparatus is connected to a network, and includes a file obtaining unit, a first workflow determining unit, a workflow executing unit, a file analyzing unit, a processing determining unit, and a second workflow determining unit. The file obtaining unit obtains a file stored in a file storage unit. The first workflow determining unit determines a first workflow corresponding to the file storage unit from which the file is obtained, as a workflow in which the file is to be processed. The workflow executing unit processes the obtained file in accordance with the determined workflow. The file analyzing unit extracts bibliographic information that is information for classifying the file, from a file name given to the file. The processing determining unit determines processing to be performed, based on the extracted bibliographic information. In response to the processing to be performed being determined, the second workflow determining unit determines a second workflow that implements the processing, as a workflow in which the obtained file is to be processed from among multiple workflows set in advance. In response to the processing to be performed being determined, the workflow executing unit processes the obtained file in accordance with the second workflow instead of processing the file in accordance with the first workflow.

SUMMARY

However, the techniques disclosed in Japanese Patent No. 5535054 and No. 5845667 have an issue in that selection of a workflow to be executed is not receivable when a folder that stores a file is associated with multiple workflows.

Aspects of non-limiting embodiments of the present disclosure relate to an information processing apparatus, a non-transitory computer readable medium, and an information processing method that make selection of a workflow to be executed receivable even when a folder that stores a file is associated with multiple workflows.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: receive, in response to storage of a file in a folder associated with multiple workflows, designation of selecting a workflow to be executed using the file from among the multiple workflows from a user; and execute the workflow for which the designation is received.

BRIEF DESCRIPTION OF THE DRAWINGS

An exemplary embodiment of the present disclosure will be described in detail based on the following figures, wherein:

FIG. 4 is a schematic diagram illustrating an example of a configuration of a workflow management database according to the exemplary embodiment;

FIG. 13 illustrates an example of the displayed instruction input screen according to the exemplary embodiment; and FIG. 14 illustrates an example of the displayed workflow selection screen according to the exemplary embodiment.

DETAILED DESCRIPTION

An exemplary embodiment of the present disclosure will be described in detail below with reference to the accompanying drawings. In the exemplary embodiment of the present disclosure, multiple kinds of processing included in a workflow are referred to as "tasks". The term "workflow" according to the exemplary embodiment refers to "a flow or set of a series of works performed in conjunction with one another in response to a user operation". A specific example of the "user operation" herein may be an operation related to a document file.

For example, an approval task performs processing of transmitting a message to one or more designated users, performs processing of receiving acceptance or decline of approval from the one or more designated users, and performs processing of advancing the workflow to the next result. For example, a notification task performs processing of transmitting a message to one or more designated users, performs processing of receiving completion of an operation from the one or more designated users, and performs processing of advancing the workflow to the next result.

Figure 1:
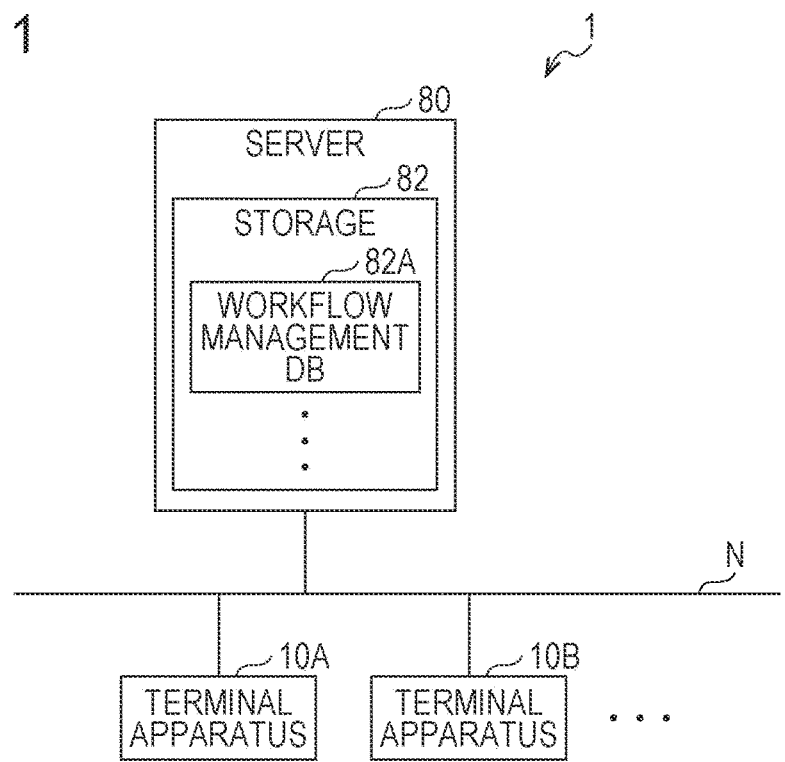
FIG. 1 is a block diagram illustrating an example of a configuration of an information processing system according to an exemplary embodiment.

A configuration of an information processing system 1 according to the exemplary embodiment will be described first with reference to FIG. 1. FIG. 1 is a block diagram illustrating an example of the configuration of the information processing system 1 according to the exemplary embodiment.

As illustrated in FIG. 1, the information processing system 1 according to the exemplary embodiment includes multiple terminal apparatuses 10A, 10B, . . . , and a server 80. Each of the multiple terminal apparatuses 10A, 10B, . . . serves as an information processing apparatus in exemplary embodiments of the present disclosure. When the terminal apparatuses 10A, 10B, . . . are described without being distinguished from each other, the terminal apparatuses 10A, 10B, . . . are simply referred to as "terminal apparatuses 10".

Examples of the terminal apparatuses 10 and the server 80 include various stationary computers such as personal computers (PCs) and a server computer. However, the terminal apparatuses 10 and the server 80 are not limited to the computers of this type. The terminal apparatuses 10 may be various portable information processing apparatuses such as smartphones, tablet terminals, and portable information terminals.

The terminal apparatuses 10 and the server 80 are connected to each other via a network N. Thus, the terminal apparatuses 10 and the server 80 can communicate with each other via the network N. In the exemplary embodiment, the network N to be used is a public communication network such as Internet or a telephone network. However, the network N is not limited to the communication network of this type. For example, the network N to be used may be an intra-company communication network such as a local area network (LAN) or a wide area network (WAN), or a combination of the intra-company communication network and the public communication network. In the exemplary embodiment, the network N to be used is a wired communication network. However, the network N is not limited to the communication network of this type and may be a wireless communication network or a combination of the wired communication network and the wireless communication network.

As illustrated in FIG. 1, the server 80 according to the exemplary embodiment includes a storage 82. The storage 82 stores a workflow management database (DB) 82A. The storage 82 is implemented by a hard disk drive (HDD), a solid state drive (SSD), or a flash memory, for example. The workflow management database 82A will be described later in detail.

Each of the multiple terminal apparatuses 10 according to the exemplary embodiment is used by a person (hereinafter, referred to as an "executor") who executes a corresponding task included in a workflow.

Figure 2:
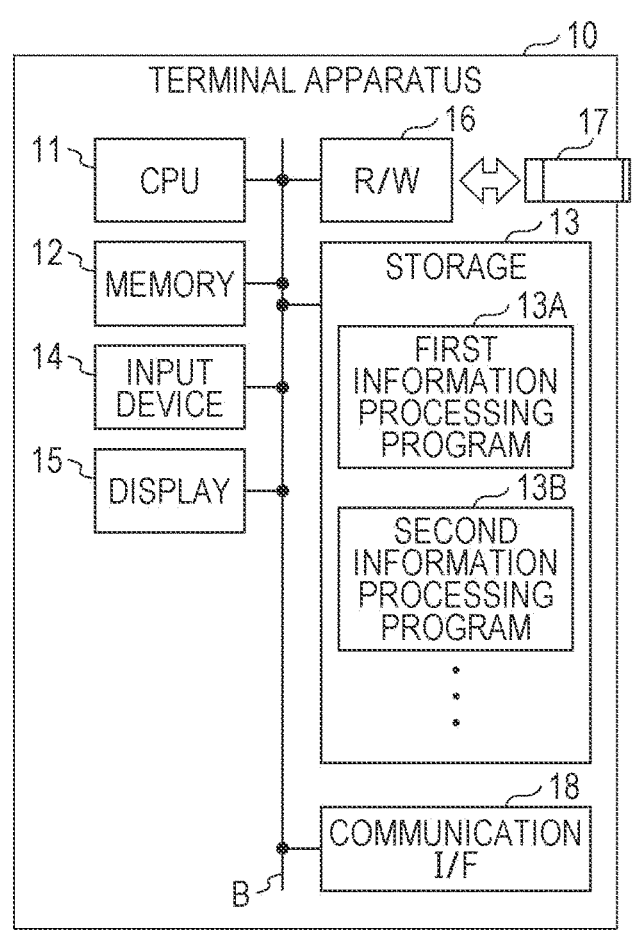
FIG. 2 is a block diagram illustrating an example of a hardware configuration of a terminal apparatus according to the exemplary embodiment.
Figure 3:
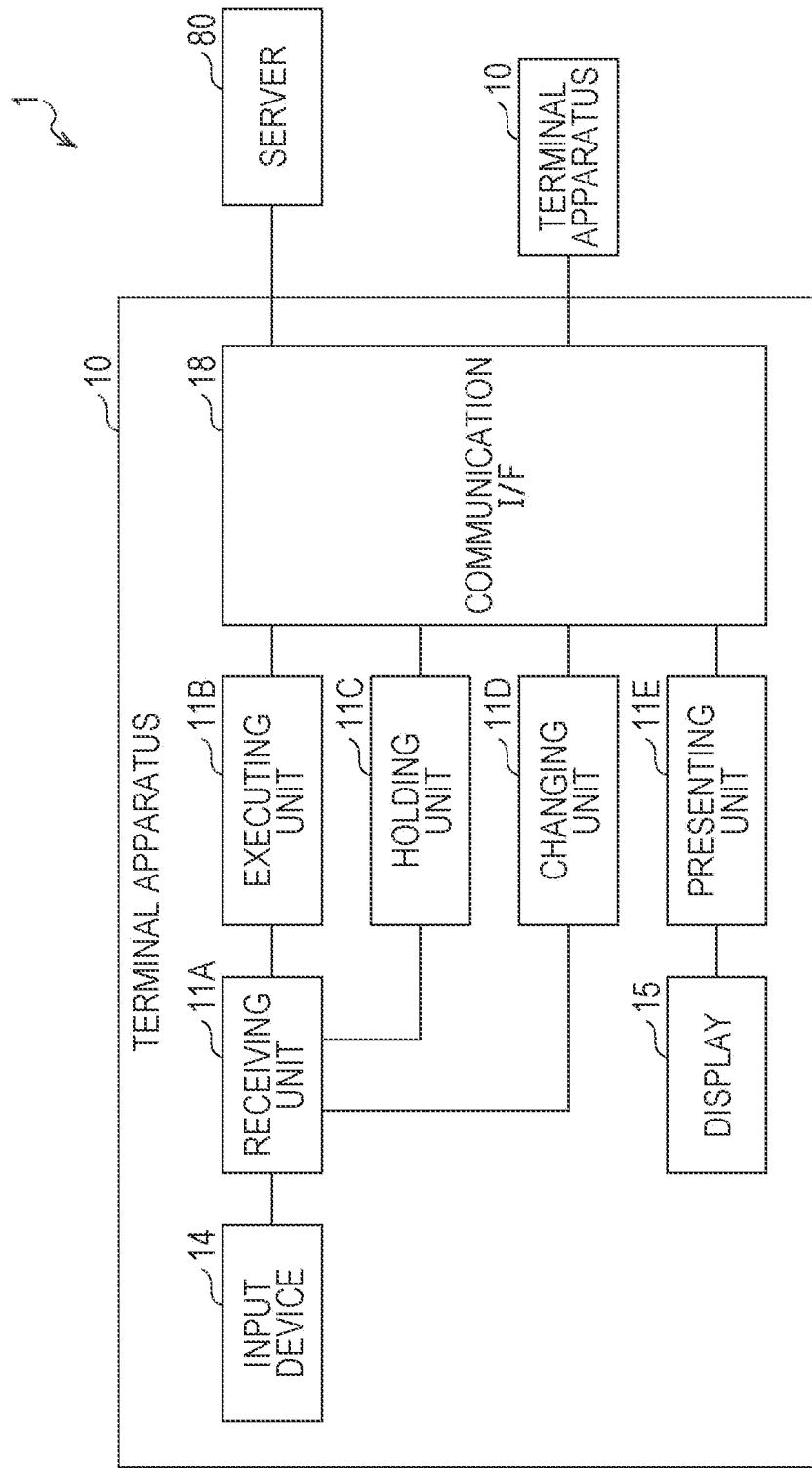
FIG. 3 is a block diagram illustrating an example of a functional configuration of the terminal apparatus according to the exemplary embodiment.

A configuration of each of the terminal apparatuses 10 according to the exemplary embodiment will be described next with reference to FIGS. 2 and 3. FIG. 2 is a block diagram illustrating an example of a hardware configuration of the terminal apparatus 10 according to the exemplary embodiment. FIG. 3 is a block diagram illustrating an example of a functional configuration of the terminal apparatus 10 according to the exemplary embodiment.

As illustrated in FIG. 2, the terminal apparatus 10 according to the exemplary embodiment includes a central processing unit (CPU) 11 that serves as a processor, a memory 12 that serves as a temporary storage area, a storage 13 that is nonvolatile, an input device 14 such as a keyboard and a mouse, a display 15 such as a liquid crystal display, a medium reader/writer (R/W) 16, and a communication interface (I/F) 18. The CPU 11, the memory 12, the storage 13, the input device 14, the display 15, the medium reader/writer 16, and the communication I/F 18 are connected to each other via a bus B. The medium reader/writer 16 reads information written on a recording medium 17 and writes information on the recording medium 17.

The storage 13 according to the exemplary embodiment is implemented by an HDD, an SSD, or a flash memory, for example. The storage 13 that serves as a storage medium stores a first information processing program 13A and a second information processing program 13B.

The recording medium 17 having the first information processing program 13A written thereon is connected to the medium reader/writer 16, and the medium reader/writer 16 reads the first information processing program 13A from the recording medium 17. In this manner, the first information processing program 13A is stored (installed) in the storage 13. In addition, the recording medium 17 having the second information processing program 13B written thereon is connected to the medium reader/writer 16, and the medium reader/writer 16 reads the second information processing program 13B from the recording medium 17. In this manner, the second information processing program 13B is stored in the storage 13. The CPU 11 loads the first information processing program 13A and the second information processing program 13B from the storage 13 into the memory 12 as appropriate and sequentially executes processes of these programs.

The functional configuration of the terminal apparatus 10 according to the exemplary embodiment will be described next with reference to FIG. 3. As illustrated in FIG. 3, the terminal apparatus 10 includes a receiving unit 11A, an executing unit 11B, a holding unit 11C, a changing unit 11D, and a presenting unit 11E. The CPU 11 of the terminal apparatus 10 executes the first information processing program 13A and the second information processing program 13B to function as the receiving unit 11A, the executing unit 11B, the holding unit 11C, the changing unit 11D, and the presenting unit 11E.

The receiving unit 11A according to the exemplary embodiment receives, in response to storage of a file in a folder associated with multiple workflows, designation of selecting a workflow to be executed using the file from among the multiple workflows from a user.

In the exemplary embodiment, the user from whom the receiving unit 11A receives the designation of selecting a workflow in this case is a user who has stored the file in the folder but is not limited to such a user. For example, the user from whom the receiving unit 11A receives the designation may be an administrator who manages the information processing system 1 (hereinafter, simply referred to as an "administrator") or a user who is neither the administrator nor the user who has stored the file in the folder.

The executing unit 11B according to the exemplary embodiment executes the workflow for which the designation is received by the receiving unit 11A.

The receiving unit 11A according to the exemplary embodiment also receives second designation of selecting not to execute any of the multiple workflows from the user besides the designation of selecting a workflow to be executed described above.

The holding unit 11C according to the exemplary embodiment holds, in response to the receiving unit 11A receiving the second designation, the file stored in the folder without executing any of the multiple workflows.

In the exemplary embodiment, the manner in which the holding unit 11C holds the file is storing the file in the storage 82 of the server 80. However, the manner of holding the file is not limited to this. For example, the manner in which the holding unit 11C holds the file may be storing the file in the storage 13 of the terminal apparatus 10 used by the administrator or in the storage 13 of any of the other terminal apparatuses 10.

The receiving unit 11A according to the exemplary embodiment further receives designation of selecting a workflow to be executed using the held file from the user, in response to a reference being made to the folder after a time point of receiving the second designation in the case of receiving the second designation.

In the exemplary embodiment, the user from whom the receiving unit 11A receives the designation of selecting a workflow in this case is the user who has made the reference to the folder but is not limited to such a user. For example, the user from whom the receiving unit 11A receives the designation of selecting a workflow may be the administrator or a user who is neither the administrator nor the user who has made the reference to the folder.

The receiving unit 11A according to the exemplary embodiment further receives a change instruction for changing a setting of the workflow from the user at a first timing that is predetermined. In accordance with the change instruction received by the receiving unit 11A, the changing unit 11D according to the exemplary embodiment changes the setting of the workflow subjected to the change instruction in accordance with the change instruction received by the receiving unit 11A.

In the exemplary embodiment, the first timing is a timing when the designation of selecting a workflow to be executed is received and a timing when the folder is opened but is not limited to such timings. For example, the first timing may be only one of these two timings.

The presenting unit 11E according to the exemplary embodiment presents progress information indicating a progress of the workflow at a second timing that is predetermined.

In the exemplary embodiment, the second timing is a timing when the designation of selecting a workflow to be executed is received and a timing when the folder is opened but is not limited to such timings. For example, the second timing may be only one of these two timings.

The receiving unit 11A according to the exemplary embodiment further receives, when the progress is that the corresponding workflow is in execution, a suspend instruction for suspending execution of the workflow or a cancel instruction for cancelling execution of the workflow from the user. The executing unit 11B according to the exemplary embodiment performs processing corresponding to the suspend or cancel instruction received by the receiving unit 11A.

In the exemplary embodiment, the user from whom the receiving unit 11A receives the suspend or cancel instruction in this case is usually the user who has made the designation of selecting a workflow or the user who has opened the folder but is not limited to such a user obviously.

The receiving unit 11A according to the exemplary embodiment further receives a resume instruction for resuming execution of the corresponding workflow from the user, in response to receiving the suspend instruction. The executing unit 11B according to the exemplary embodiment executes processing corresponding to the resume instruction received by the receiving unit 11A.

In the exemplary embodiment, the user from whom the receiving unit 11A receives the resume instruction in this case is usually the user who has given the suspend instruction or the user who has opened the folder but is not limited to such a user obviously.

The workflow management database 82A according to the exemplary embodiment will be described next with reference to FIG. 4. FIG. 4 is a schematic diagram illustrating an example of a configuration of the workflow management database 82A according to the exemplary embodiment.

The workflow management database 82A according to the exemplary embodiment is a database to which information regarding workflows is registered. For example, in the workflow management database 82A according to the exemplary embodiment, various kinds of information such as a folder name, a workflow identification (ID), a display name, a task, a file name, and a status are stored in association with one another as illustrated in FIG. 4.

The folder name is information indicating a name of a folder for which an associated workflow is executed using a file in response to storage of the file in the folder. The workflow ID is information given in advance to individually identify a workflow associated with the corresponding folder so that different workflows have different workflow IDs.

The display name is information indicating the name of the corresponding workflow used when the workflow is displayed. The task is information indicating names of tasks (hereinafter, referred to as "task names") included in the corresponding workflow in a chronological order in which the tasks are to be executed. The file name is information indicating a name of the file stored in the corresponding folder so that the corresponding workflow is to be executed. The status is information indicating the progress of the workflow executed using the corresponding file.

In the exemplary embodiment, as the status, four kinds of statuses, namely, "completed", "cancelled", "suspended", and "in execution" are used. The status "completed" indicates that the workflow is completed. The status "cancelled" indicates that the workflow is cancelled. The status "suspended" indicates that the workflow is suspended. The status "in execution" indicates that the workflow is in execution. The status "suspended" and the status "cancelled" include therein information (in the exemplary embodiment, the task name) indicating the task executed most recently to the suspension or cancellation. The status "in execution" also includes therein information (in the exemplary embodiment, the task name) indicating the task executed most recently to that time point.

The information indicating the status is not limited to the information described above. For example, the kinds of the statuses are not limited to the four kinds, i.e., "completed", "cancelled", "suspended", and "in execution". For example, any one of these four kinds or a combination of any two or three of these four kinds may be used as the kinds of statuses. Alternatively, another kind of the status indicating the progress of the corresponding workflow may be used in addition to these four kinds.

The example illustrated in FIG. 4 indicates that a workflow assigned the workflow ID "WF001" and the display name "purchase application flow" is associated with a folder assigned the folder name "F001". The example illustrated in FIG. 4 also indicates that tasks "verify", "sign", . . . are to be executed in this order in the workflow assigned the display name "purchase application flow". The example illustrated in FIG. 4 further indicates that the workflow assigned the display name "purchase application flow" uses a file assigned the file name "PA216818" at this time point and the progress for this file is that the workflow is in execution up to the approval task.

Various kinds of information (not illustrated) set for each task such as an approver in the case of the approval task and a signing person in the case of the sign task are also registered to the workflow management database 82A.

Figure 5:
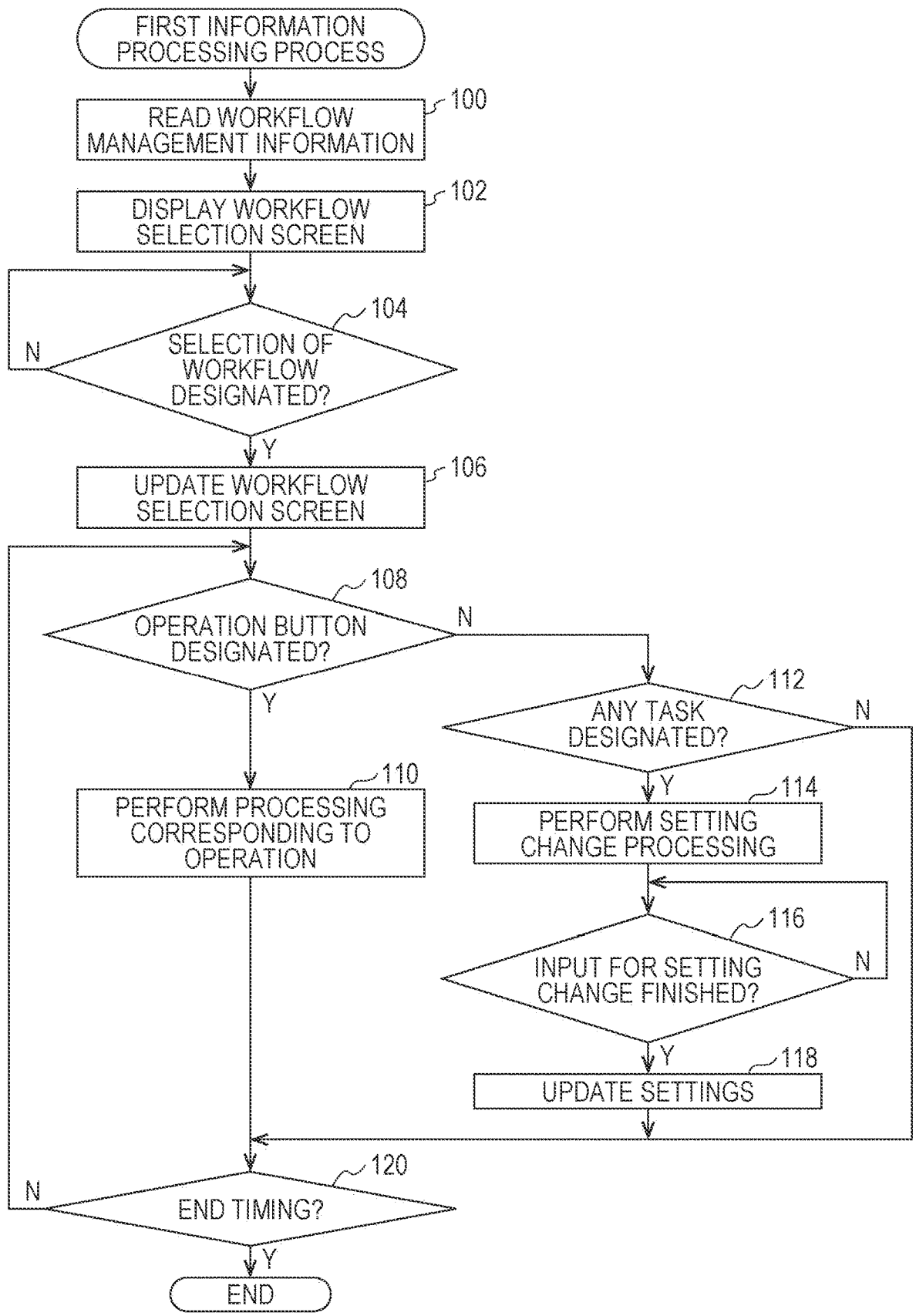
FIG. 5 is a flowchart illustrating an example of a first information processing process according to the exemplary embodiment.

An operation of the information processing system 1 according to the exemplary embodiment, specifically, an operation performed when the terminal apparatus 10 that plays a central role in the information processing system 1 performs a first information processing process will be described next with reference to FIG. 5. FIG. 5 is a flowchart illustrating an example of the first information processing process according to the exemplary embodiment.

The first information processing process according to the exemplary embodiment is performed as a result of the CPU 11 of the terminal apparatus 10 executing the first information processing program 13A in response to a user designating, via the input device 14, a folder (hereinafter, referred to as a "target folder") associated with multiple workflows. To avoid complexity, the case will be described where the workflow management database 82A is already created.

Figure 6:
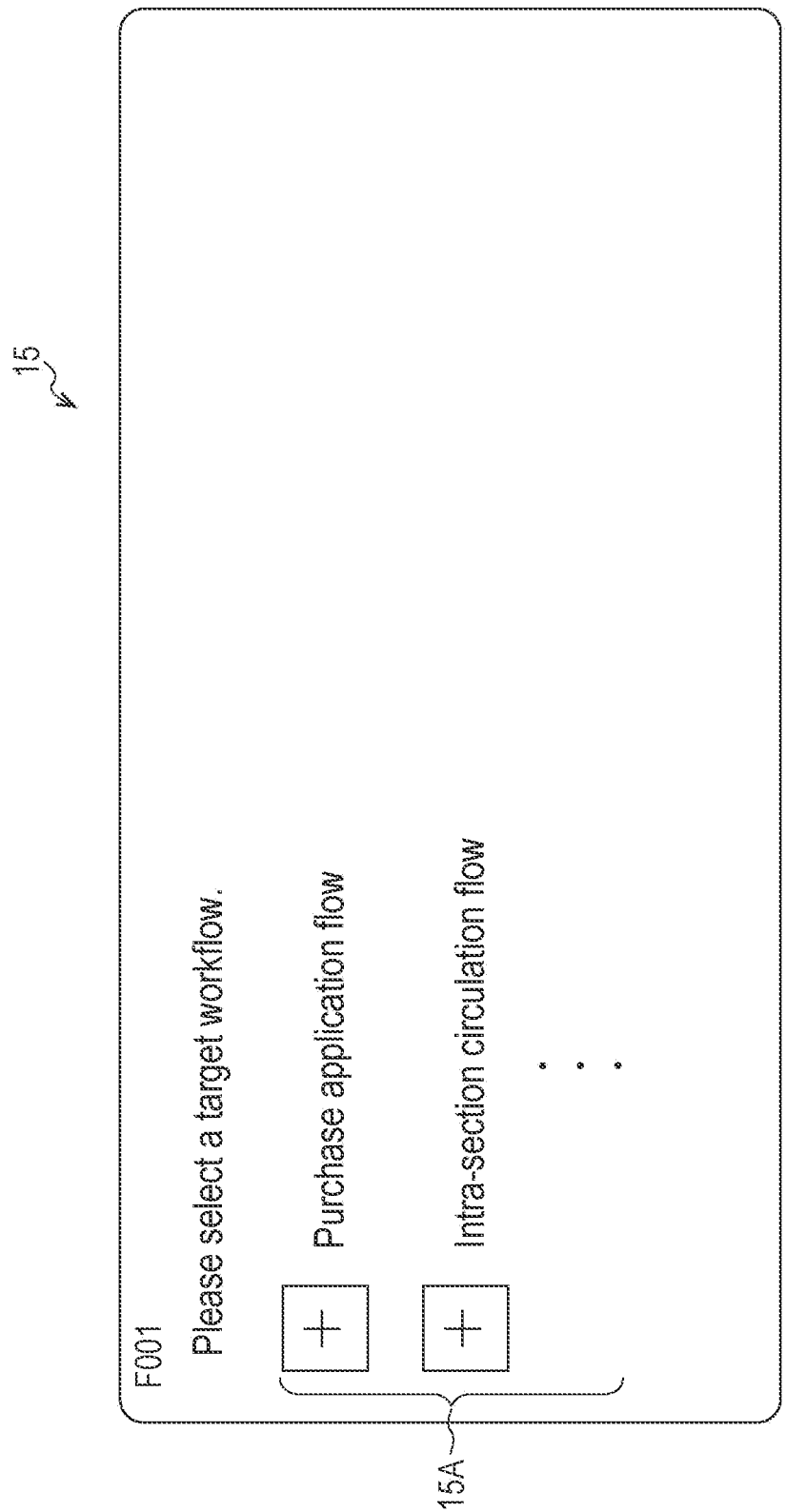
FIG. 6 illustrates an example of a workflow selection screen according to the exemplary embodiment.

In step 100 in FIG. 5, the CPU 11 reads all information (hereinafter, referred to as "workflow management information") regarding the target folder from the workflow management database 82A. In step 102, the CPU 11 controls the display 15 to display a workflow selection screen having a predetermined configuration by using information indicating the display name(s) included in the read workflow management information. FIG. 6 illustrates an example of the workflow selection screen according to the exemplary embodiment.

As illustrated in FIG. 6, a message prompting a user to select a workflow serving as a target is displayed in the workflow selection screen according to the exemplary embodiment. In the workflow selection screen according to the exemplary embodiment, the display names (workflow names) included in the read workflow management information are individually displayed along with workflow selection buttons 15A each of which is to be designated to select a corresponding workflow.

In response to the workflow selection screen being displayed, the user designates, using the input device 14, the workflow selection button 15A corresponding to the workflow name of the workflow serving as the target. Thus, in step 104, the CPU 11 stands by until any of the workflow selection buttons 15A is designated. Hereinafter, a workflow corresponding to the workflow selection button 15A designated by the user is referred to as a "target workflow".

Figure 7:
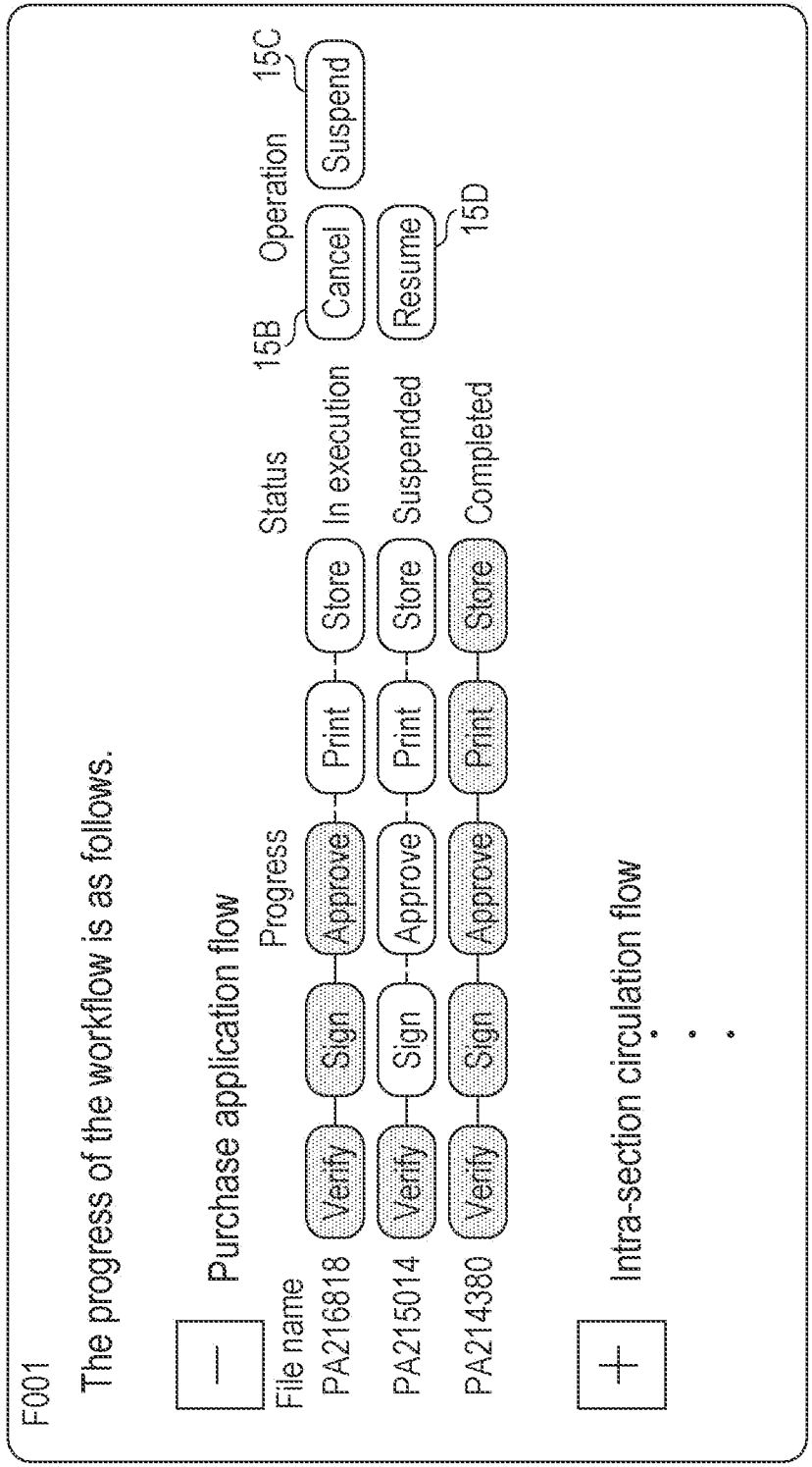
FIG. 7 illustrates an example of the workflow selection screen according to the exemplary embodiment displayed after the update.

In step 106, the CPU 11 controls the display 15 to update the workflow selection screen to display detailed information regarding the target workflow by using the information regarding the target workflow included in the read workflow management information. FIG. 7 illustrates an example of the workflow selection screen according to the exemplary embodiment displayed after the update.

As illustrated in FIG. 7, in the updated workflow selection screen according to the exemplary embodiment, for the displayed target workflow, information indicating the progress (corresponding to the progress information described above) is displayed, along with information indicating the status, for each file stored in association with the target workflow.

At this time, the progress information is displayed such that information (in the exemplary embodiment, task names) indicating the tasks executed in the target workflow is displayed in the chronological order and such that display areas of tasks that are completed and display areas of tasks that are not completed are different from each other. Thus, with reference to the workflow selection screen, the user can easily grasp the progress of the target workflow for each file stored in the designated target folder.

In the updated workflow selection screen according to the exemplary embodiment, operation buttons, i.e., a cancel button 15B and a suspend button 15C are displayed for a file having the status "in execution". An operation button, i.e., a resume button 15D is displayed for a file having the status "suspended".

Thus, the user designates the cancel button 15B when the user wishes to cancel the target workflow for the file having the status "in execution" among the displayed files. The user designates the suspend button 15C when the user wishes to temporarily suspend the target workflow for the file having the status "in execution" among the displayed files. The user designates the resume button 15D when the user wishes to resume execution of the target workflow for the file having the status "suspended" among the displayed files.

Thus, in step 108, the CPU 11 determines whether any operation button among the cancel button 15B, the suspend button 15C, and the resume button 15D is designated. If a positive determination is obtained, the process proceeds to step 110.

In step 110, the CPU 11 performs processing corresponding to the operation button designated by the user. The process then proceeds to step 120.

Specifically, in response to the user designating the cancel button 15B, the CPU 11 performs processing of cancelling execution of the task(s) yet to be executed for the corresponding file. The CPU 11 then stores "cancelled" as the corresponding status along with information indicating the task executed most recently in the workflow management database 82A (updates the status in the workflow management database 82A).

For example, the case is exemplified where the cancel button 15B is designated for the file assigned the file name "PA216818" in FIG. 7, that is, the cancel button 15B is designated upon completion of the approval task immediately preceding a print task. In this case, the CPU 11 performs control so that a print function of the print task is not to be executed. In this case, since the approval by the approver is finished through the approval task, the approver is not notified of the cancellation of the workflow.

By contrast, for example, if the cancel button 15B is designated for the file assigned the file name "PA216818" in FIG. 7 upon completion of the sign task immediately preceding the approval task, the CPU 11 performs control so that an approve request is not delivered to the approver by the approval task. If an approve screen is displayed on the terminal apparatus 10 used by the approver, the CPU 11 performs control to display a message "Approval is no longer required because this workflow is cancelled.", for example.

Likewise, in response to the user designating the suspend button 15C, the CPU 11 preforms processing of suspending the corresponding target workflow. In response to the user designating the resume button 15D, the CPU 11 performs processing of resuming execution of the corresponding target workflow that has been suspended.

If a negative determination is obtained in step 108, the process proceeds to step 112. In step 112, the CPU 11 determines whether the display area of any of the tasks is designated. If a negative determination is obtained, the process proceeds to step 120. If a positive determination is obtained, the process proceeds to step 114.

In step 114, the CPU 11 performs setting change processing that is processing of changing a setting for the designated task (hereinafter, referred to as a "target task") in the following manner.

Figure 8:
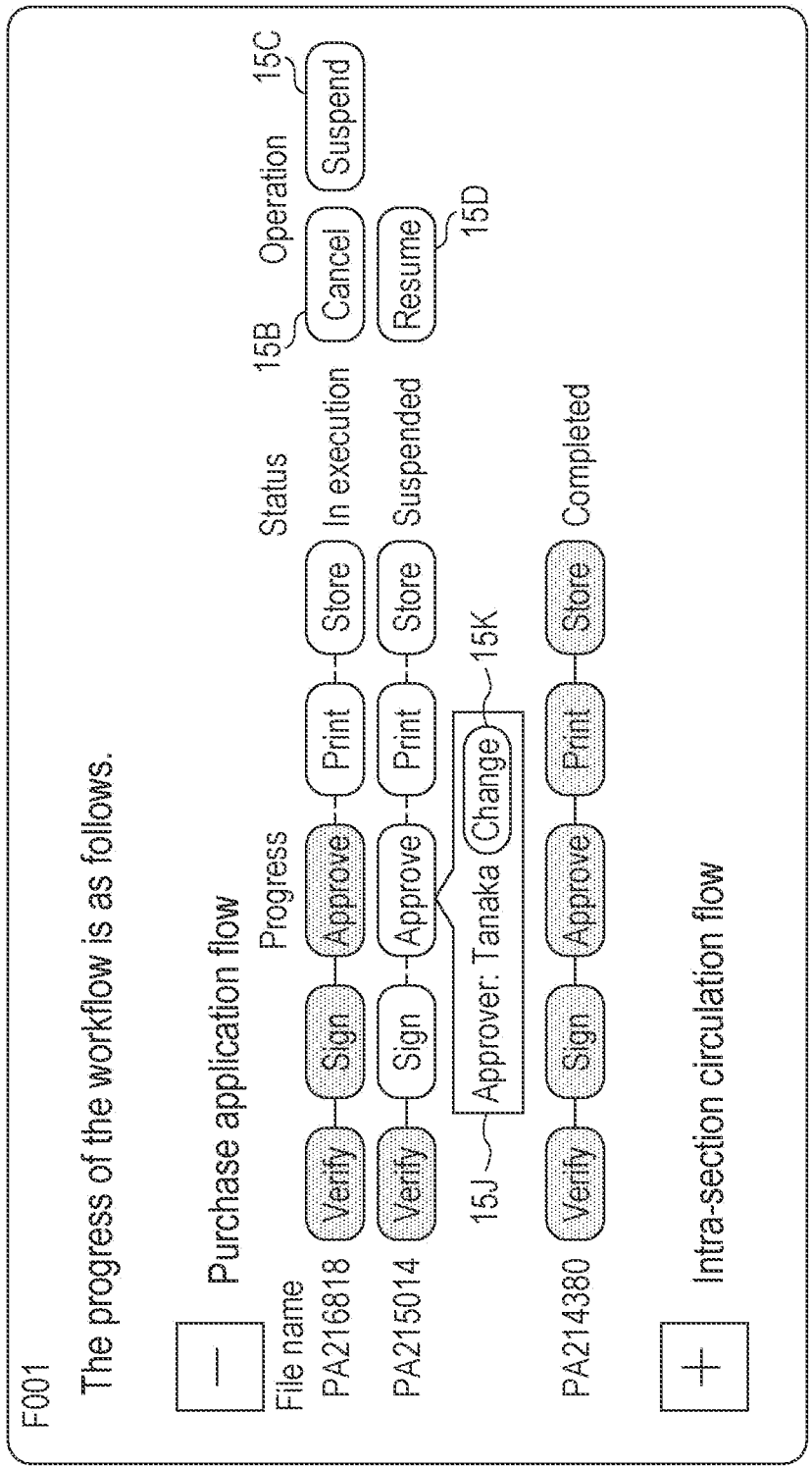
FIG. 8 illustrates an example of the workflow selection screen according to the exemplary embodiment displayed after the update.

First, the CPU 11 controls the display 15 to display a balloon 15J that originates from the display area of the target task and includes a change button 15K as illustrated in FIG. 8, for example.

The user then inputs a setting to be changed in the displayed balloon 15J, and designates the change button 15K. In the example illustrated in FIG. 8, the case of changing the approver in the approval task is exemplified.

Thus, in step 116, the CPU 11 stands by until the change button 15K is designated, that is, stands by until the user finishes changing the setting for the target task. In step 118, the CPU 11 reflects the setting changed by the user in the workflow management database 82A. The process then proceeds to step 120.

In step 120, the CPU 11 determines whether a timing to end the first information processing process has come. If a negative determination is obtained, the process returns to step 108. On the other hand, if a positive determination is obtained, the first information processing process ends. In the exemplary embodiment, the timing to end the first information processing process described above is a timing when the target folder is closed by the user but is not limited to such a timing. For example, the timing to end the first information processing process may be a timing when instruction information indicating the end of the first information processing process is input by the user via the input device 14.

Figure 9:
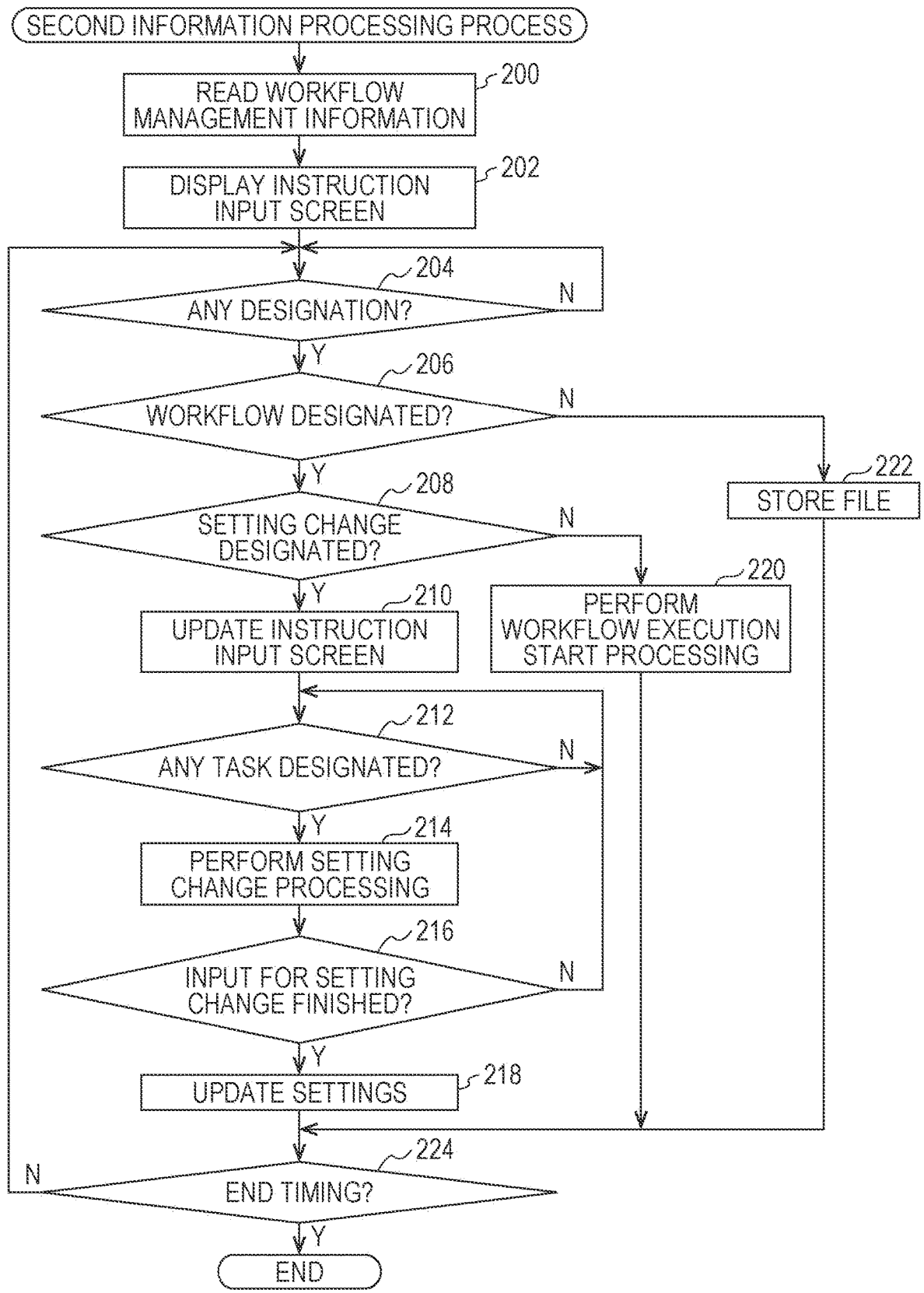
FIG. 9 is a flowchart illustrating an example of a second information processing process according to the exemplary embodiment.

An operation performed when the terminal apparatus 10 performs a second information processing process will be described next with reference to FIG. 9. FIG. 9 is a flowchart illustrating an example of the second information processing process according to the exemplary embodiment.

The second information processing process according to the exemplary embodiment is performed as a result of the CPU 11 of the terminal apparatus 10 executing the second information processing program 13B in response to storage, in the target folder, of a file (hereinafter, referred to as a "target file") for which the workflow associated with the target folder is to be executed. To avoid complexity, the case will be described where the workflow management database 82A is already created.

In step 200 in FIG. 9, the CPU 11 reads all information regarding the target folder from the workflow management database 82A. Hereinafter, the information read at this time is also referred to as "workflow management information".

Figure 10:
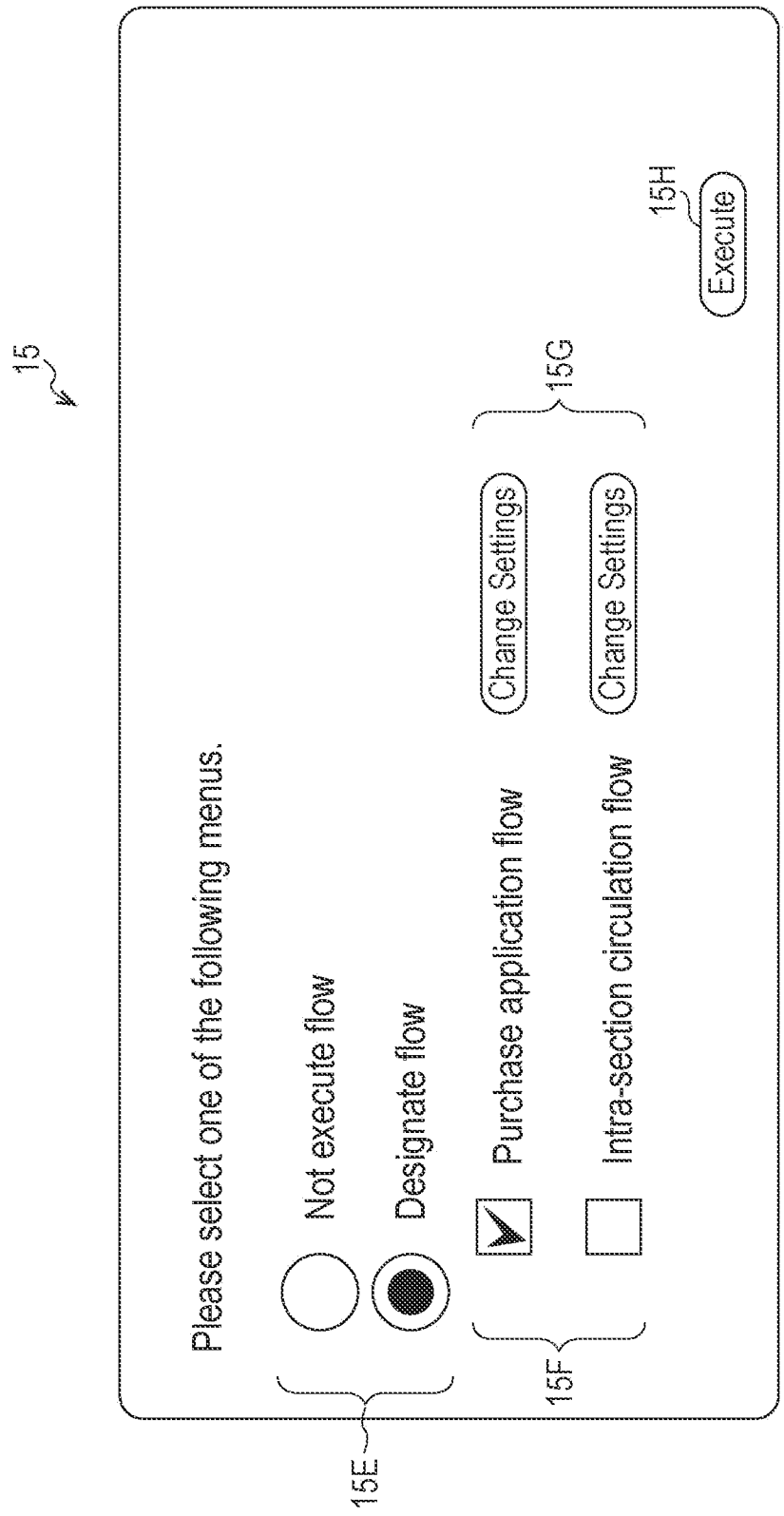
FIG. 10 illustrates an example of an instruction input screen according to the exemplary embodiment.

In step 202, the CPU 11 controls the display 15 to display an instruction input screen having a predetermined configuration by using information indicating the display name(s) included in the read workflow management information. FIG. 10 illustrates an example of the instruction input screen according to the exemplary embodiment.

As illustrated in FIG. 10, a message prompting a user to select any of menus is displayed in the instruction input screen according to the exemplary embodiment. In the instruction input screen according to the exemplary embodiment, a menu "not execute flow" indicating that none of the workflows are to be executed and a menu "designate flow" indicating that a workflow to be executed is to be designated are displayed along with menu selection buttons 15E each of which is to be designated to select a corresponding menu.

In the instruction input screen according to the exemplary embodiment, the display names (workflow names) included in the read workflow management information are individually displayed along with workflow selection buttons 15F each of which is to be designated to select a corresponding workflow.

In the instruction input screen according to the exemplary embodiment, change settings buttons 15G each of which is to be designated to change settings of tasks in the corresponding workflow, and an execute button 15H that is to be designated to start execution of the selected workflow are displayed.

For example, in response to the instruction input screen illustrated in FIG. 10 being displayed, the user designates the menu selection button 15E corresponding to the menu "not execute flow" by using the input device 14 if the user executes none of the workflows using the target file.

If the user designates a workflow to be executed using the target file, the user designates the menu selection button 15E corresponding to the menu "designate flow" and then designates the workflow selection button 15F corresponding to the name of the target workflow to be executed. In this case, if the user changes settings of the tasks in the designated workflow, the user designates the change settings button 15G corresponding to the workflow and designates the execute button 15H to start execution of the selected workflow.

Thus, in step 204, the CPU 11 stands by until any of the menu selection button 15E corresponding to the menu "not execute flow", the change settings buttons 15G, and the execute button 15H is designated. Hereinafter, the workflow corresponding to the workflow selection button 15F designated by the user along with any of the change settings buttons 15G or the execute button 15H is also referred to as a "target workflow".

In step 206, the CPU 11 determines whether any of the change settings buttons 15G or the execute button 15H is designated by the user to determine whether the target workflow is designated by the user. If a positive determination is obtained, the process proceeds to step 208. In step 208, the CPU 11 determines whether any of the change settings buttons 15G is designated by the user. If a positive determination is obtained, the process proceeds to step 210.

Figure 11:
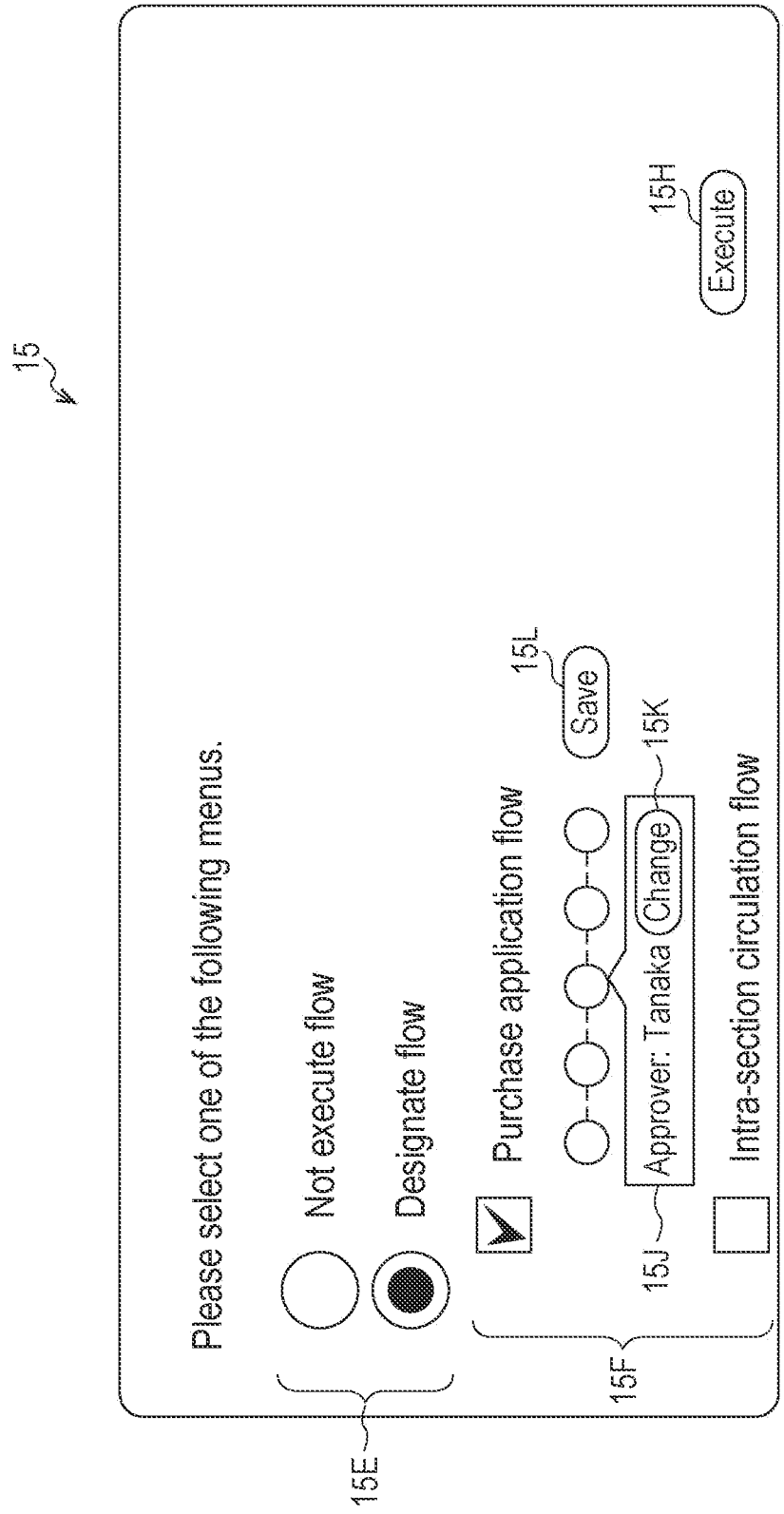
FIG. 11 illustrates an example of the instruction input screen according to the exemplary embodiment displayed after the update.

In step 210, the CPU 11 controls the display 15 to update the instruction input screen to display information regarding the target workflow by using the information regarding the target workflow included in the read workflow management information. FIG. 11 illustrates an example of the instruction input screen according to the exemplary embodiment displayed after the update.

As illustrated in FIG. 11, in the updated instruction input screen according to the exemplary embodiment, information indicating tasks included in the target workflow is displayed in the chronological order for the displayed target workflow.

In the example illustrated in FIG. 11, each of the tasks is schematically displayed as a circle. However, the display style of each of the tasks is not limited to this style. For example, as illustrated in FIG. 7, information (in the example illustrated in FIG. 7, the task names) indicating the corresponding tasks may be displayed obviously.

In the updated instruction input screen according to the exemplary embodiment, a setting of a displayed task can be changed by designating the display area of the task.

Thus, in step 212, the CPU 11 stands by until the display area of any of the tasks is designated. In step 214, the CPU 11 performs setting change processing that is processing of changing a setting for the designated task in the following manner.

First, the CPU 11 controls the display 15 to display the balloon 15J that originates from the display area of the designated task and includes the change button 15K along with a save button 15L as illustrated in FIG. 11, for example.

The user then inputs a setting to be changed in the displayed balloon 15J, and designates the change button 15K. After finishing changing the setting of at least one task to a suitable setting, the user designates the save button 15L. In the example illustrated in FIG. 11, the case of changing the approver in the approval task is exemplified.

In step 216, the CPU 11 determines whether the save button 15L is designated to determine whether the user has finished the input for changing settings of the target workflow. If a negative determination is obtained, the process returns to step 212. If a positive determination is obtained, the process proceeds to step 218.

In step 218, the CPU 11 reflects the setting changed by the user in the workflow management database 82A. The process then proceeds to step 224.

If a negative determination is obtained in step 208, the CPU 11 regards that the execute button 15H is designated by the user and the process proceeds to step 220. In step 220, the CPU 11 performs workflow execution start processing that is processing of starting execution of the target workflow. The process then proceeds to step 224.

In the exemplary embodiment, the workflow execution start processing includes processing of transmitting information for giving an instruction for executing a task to be executed first in the target workflow, to the terminal apparatus 10 used by an executor of the task and processing of updating the corresponding status to "in execution", for example. However, the workflow execution start processing is not limited to such processing and may include processing of notifying the terminal apparatuses 10 used by executors of all the tasks included in the target workflow that execution of the target workflow has been started. The CPU 11 then sequentially performs processing related to each of the tasks included in the target workflow.

Figure 12:
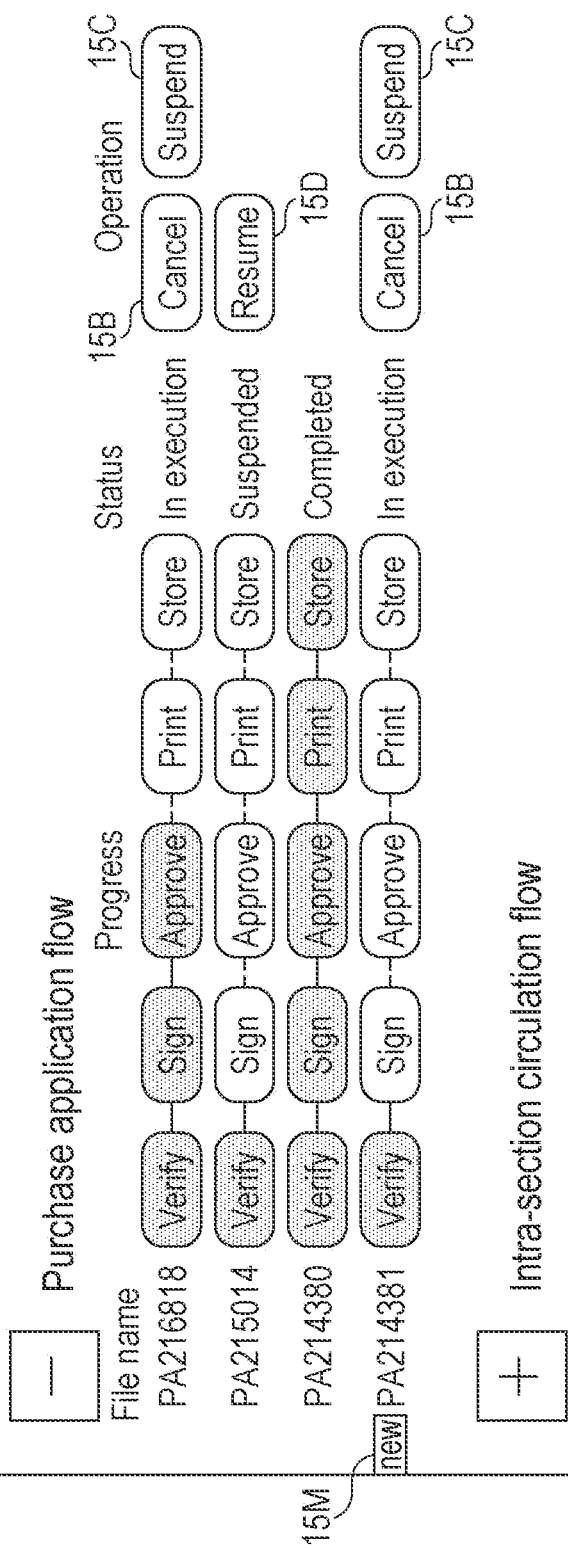
FIG. 12 illustrates an example of the displayed workflow selection screen according to the exemplary embodiment.

When the workflow selection screen described above is displayed after the workflow execution start processing is performed in step 220, the target file for which execution of the workflow has been started in the workflow execution start processing is displayed as a new file as illustrated in FIG. 12, for example. In the example illustrated in FIG. 12, a new marking 15M is displayed to indicate the new file.

If a negative determination is obtained in step 206, the CPU 11 regards that the menu "not execute flow" is designated by the user as illustrated in FIG. 13, for example, and thus the process proceeds to step 222. In step 222, the CPU 11 newly stores the target file stored in the target folder in a storage area, of the workflow management database 82A, related to the target folder. The CPU 11 then stores "suspended" in the corresponding status in the workflow management database 82A. The process then proceeds to step 224. In this case, since there is no task most recently executed, information indicating such a task is not stored.

As described above, in the exemplary embodiment, "suspended" is set as the status of the target file when the target file is merely stored in the target folder without designation of the workflow to be applied. However, the status to be set is not limited to such a status. For example, a new kind of the status "before execution" indicating a stage before the workflow is executed may be set. In this case, "before execution" may be stored in the status of the target file in the workflow management database 82A.

If the target file is stored in the workflow management database 82A through the processing in step 222, the CPU 11 controls the display 15 to display the workflow selection screen as illustrated in FIG. 14, for example, in step 102 of the first information processing process described above.

Specifically, in this case, the CPU 11 of the terminal apparatus 10 controls the display 15 to indicate that a file (hereinafter, referred to as a "flow unassociated file") not associated with any workflow is present and to display a flow execution instruction button 15A1 that is to be designated to give an instruction for executing the workflow using the flow unassociated file as illustrated in FIG. 14.

In response to the user designating the flow execution instruction button 15A1, the CPU 11 controls the display 15 to display the flow unassociated file along with a new marking 15N indicating a new file and an execute flow button 15P that is to be designated to give an instruction for executing the workflow as illustrated in FIG. 14.

In response to the user designating the execute flow button 15P, the CPU 11 controls the display 15 to display a balloon 15S that originates from the display area of the execute flow button 15P and includes a change settings button 15Q and an execute button 15R as illustrated in FIG. 14.

The user then designates a workflow that uses the corresponding flow unassociated file, designates the change settings button 15Q if the user changes the settings of the designated workflow, and designates the execute button 15R to start execution of the designated workflow in the displayed balloon 15S.

In response to the user designating the change settings button 15Q, the CPU 11 performs processing of changing the settings for the corresponding workflow as in the processing in step 214 of the second information processing process described above.

In response to the user designating the execute button 15R, the CPU 11 associates the flow unassociated file with the designated workflow and performs the workflow execution start processing for the flow unassociated file as in the processing in step 220 of the second information processing process.

In step 224, the CPU 11 determines whether a timing to end the second information processing process has come. If a negative determination is obtained, the process returns to step 204. On the other hand, if a positive determination is obtained, the second information processing process ends. In the exemplary embodiment, the timing to end the second information processing process described above is a timing when the instruction input screen is closed by the user but is not limited to such a timing. For example, the timing to end the second information processing process may be a timing when instruction information indicating the end of the second information processing process is input by the user via the input device 14.

In the exemplary embodiment above, the case where the terminal apparatus 10 performs the first information processing process and the second information processing process has been described. However, the apparatus that performs the first information processing process and the second information processing process is not limited to the terminal apparatus 10. For example, the server 80 may perform the first information processing process and the second information processing process. Alternatively, one of the terminal apparatus 10 and the server 80 may perform the first information processing process, and the other of the terminal apparatus 10 and the server 80 may perform the second information processing process.

In the exemplary embodiment described above, the case where the various databases are registered to the server 80 has been described. However, the apparatus in which the various databases are registered is not limited to the server 80. For example, the various databases may be registered to any of the terminal apparatuses 10. Alternatively, the various databases may be registered to an apparatus that is not the server 80 and is accessible from the terminal apparatuses 10.

While the exemplary embodiment has been described above, the technical scope of the present disclosure is not limited to the scope of the exemplary embodiment described above. Various modifications or improvements can be made to the exemplary embodiment described above within a scope not departing from the gist of the present disclosure. Such modified or improved exemplary embodiments are also within the technical scope of the present disclosure.

The exemplary embodiment described above does not limit the present disclosure according to the claims, and not all combinations of features described in the exemplary embodiment are necessarily required by solutions provided by the present disclosure. The exemplary embodiment described above includes various levels of disclosure, and the various disclosures are obtained by the combination of the multiple constituent elements disclosed herein. Even if several constituent elements are removed from among all of the constituent elements described in the exemplary embodiment, the configuration without the several constituent elements may still be obtained as exemplary embodiments of the disclosure as long as advantages are obtained.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the exemplary embodiment described above, the case has been described in which the first information processing process and the second information processing process are implemented as software by executing the respective programs by a computer. However, the present disclosure is not limited to this case. For example, the first information processing process and the second information processing process may be implemented by hardware or a combination of hardware and software.

The configuration of the terminal apparatus 10 described in the exemplary embodiment above is merely an example. Thus, obviously, an unnecessary constituent element may be removed or a new constituent element may be added within a scope not departing from the gist of the present disclosure.

The flows of the various processes described in the exemplary embodiment above are merely an example. Thus, obviously, an unnecessary step may be removed, a new step may be added, or the processing order may be switched within a scope not departing from the gist of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
receive, in response to storage of a file in a folder associated with a plurality of workflows, designation of selecting a workflow to be executed using the file from among the plurality of workflows from a user;
receive second designation of selecting not executing any of the plurality of workflows from the user besides the designation of selecting the workflow to be executed;
hold, in response to receiving the second designation, the file stored in the folder without beginning executing any of the plurality of workflows; and
execute the workflow for which the designation is received.

2. The information processing apparatus according to claim 1, wherein the processor is configured to further receive designation of selecting a workflow to be executed using the held file from the user, in response to a reference being made to the folder after a time point of receiving the second designation in a case of receiving the second designation.

3. The information processing apparatus according to claim 2, wherein:

the processor is configured to:
further receive a change instruction for changing a setting of the workflow from the user at a first timing that is predetermined; and
change the setting of the workflow subjected to the change instruction in accordance with the received change instruction.

4. The information processing apparatus according to claim 3, wherein the first timing is at least one of a timing when the designation of selecting a workflow to be executed is received or a timing when the folder is opened.

5. The information processing apparatus according to claim 3, wherein the processor is configured to present progress information indicating a progress of the workflow at a second timing that is predetermined.

6. The information processing apparatus according to claim 2, wherein the processor is configured to present progress information indicating a progress of the workflow at a second timing that is predetermined.

7. The information processing apparatus according to claim 1, wherein:
the processor is configured to:
further receive a change instruction for changing a setting of the workflow from the user at a first timing that is predetermined; and
change the setting of the workflow subjected to the change instruction in accordance with the received change instruction.

8. The information processing apparatus according to claim 7, wherein the first timing is at least one of a timing when the designation of selecting a workflow to be executed is received or a timing when the folder is opened.

9. The information processing apparatus according to claim 7, wherein the processor is configured to present progress information indicating a progress of the workflow at a second timing that is predetermined.

10. The information processing apparatus according to claim 1, wherein the processor is configured to present progress information indicating a progress of the workflow at a second timing that is predetermined.

11. The information processing apparatus according to claim 10, wherein the second timing is at least one of a timing when the designation of selecting a workflow to be executed is received or a timing when the folder is opened.

12. The information processing apparatus according to claim 10, wherein:
the processor is configured to:
further receive, when the progress is that the corresponding workflow is in execution, a suspend instruction for suspending execution of the workflow or a cancel instruction for cancelling execution of the workflow from the user; and
perform processing corresponding to the received suspend or cancel instruction.

13. The information processing apparatus according to claim 12, wherein:
the processor is configured to:
further receive a resume instruction for resuming execution of the corresponding workflow from the user in a case where the suspend instruction has been received; and
perform processing corresponding to the received resume instruction.

14. A non-transitory computer readable medium storing a program causing a computer to execute a process for processing information, the process comprising:
receiving, in response to storage of a file in a folder associated with a plurality of workflows, designation of selecting a workflow to be executed using the file from among the plurality of workflows from a user;
receive second designation of selecting not executing any of the plurality of workflows from the user besides the designation of selecting the workflow to be executed;
holding, in response to receiving the second designation, the file stored in the folder without beginning executing any of the plurality of workflows; and
executing the workflow for which the designation is received.

15. An information processing method comprising:
receiving, in response to storage of a file in a folder associated with a plurality of workflows, designation of selecting a workflow to be executed using the file from among the plurality of workflows from a user;
receiving second designation of selecting not executing any of the plurality of workflows from the user besides the designation of selecting the workflow to be executed;
holding, in response to receiving the second designation, the file stored in the folder without beginning executing any of the plurality of workflows; and
executing the workflow for which the designation is received.

* * * * *